(No Model.)
J. STONEBRAKER.
FRUIT GATHERER.
No. 329,095. Patented Oct. 27, 1885.
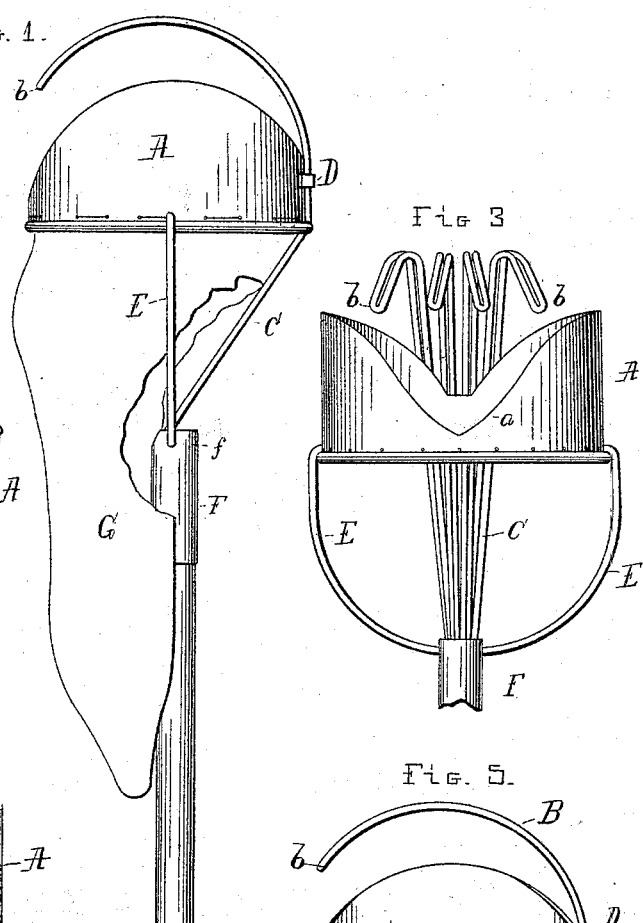
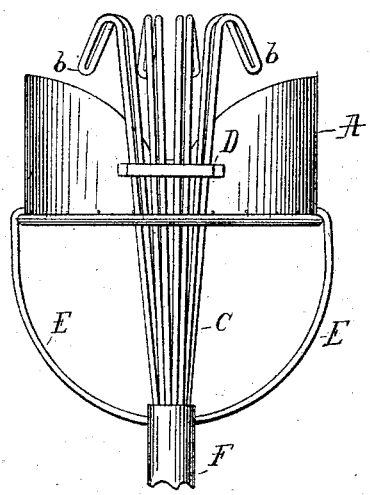
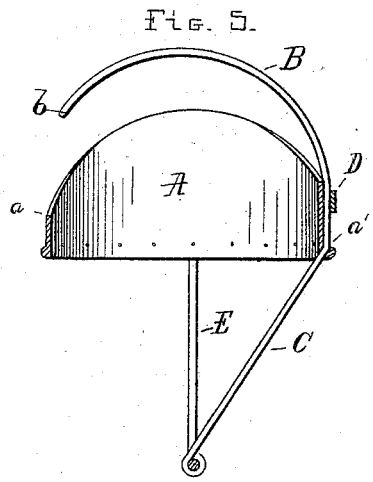
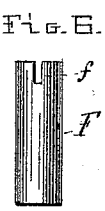
Witnesses.
R. B. Turpin.
R. W. Bishop.
Inventor.
Jeremiah Stonebraker
By R. S. & A. P. Lacey
Attys.

UNITED STATES PATENT OFFICE.

JEREMIAH STONEBRAKER, OF BARNESVILLE, OHIO.

FRUIT-GATHERER.

SPECIFICATION forming part of Letters Patent No. 329,095, dated October 27, 1885.

Application filed April 13, 1885. Serial No. 162,091. (No model.)

*To all whom it may concern:*

Be it known that I, JEREMIAH STONEBRAKER, a citizen of the United States, residing at Barnesville, in the county of Belmont and State of Ohio, have invented certain new and useful Improvements in Fruit-Gatherers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention is an improvement in fruit-pickers, and has for an object to provide a simple fruit-picker, which will pluck the fruit and direct the same into the receiver without bruising or cutting the same.

The invention consists, broadly, in an inclined platform located below the body and adapted to receive the fruit and deflect it into the receiver.

It consists, further, in the combination, with the body, of the grasping-fingers extended transversely across the mouth of said body.

It also consists in arching said grasping-fingers centrally above and away from the mouth of the body.

It also consists in the body having its front side cut away on its upper edge, in combination with the grasping-fingers having their extremities terminating approximately above such cut-away portion of the body.

It further consists in certain novel constructions, combinations, and arrangements of parts, which will be hereinafter described and claimed.

In the accompanying drawings, Figure 1 is a side view, Fig. 2 a plan view, Fig. 3 a front view, and Fig. 4 a back view, of my improved fruit-picker. Fig. 5 is a detached vertical section drawn through the body, and Fig. 6 is a side view of the socket, all of which will be described.

The body A is preferably formed of sheet metal and in cylindrical shape, as shown. The front side of this body is also preferably cut away on its upper edge at *a* in order to better admit the fruit in the operation of the improvement, which will be hereinafter described. The grasping-fingers B are formed of wire strands doubled between their ends, so as to provide blunt points *b*, as well as to furnish broad bearings for pressure on the fruit, so as to avoid bruising or cutting the same. These wires are secured between their ends to the rear side of the body, and extend below the body, and are inclined under it, forming the platform C, on which the fruit drops and by which it is deflected into the receiver.

In securing the wires to the body they are passed through openings $a'$, formed through the body near its lower edge, and are held to such body near its upper edge by a loop, D, passed over the wires and secured at its ends to the body. The wires may, if desired, be soldered in the openings $a'$ or loop D; or such openings and loop may be dispensed with and the wires riveted to the body or soldered thereto. It will also be understood that the openings might be used without the loop, and such openings are preferred, because by them the wires may be held to the body without involving the necessity of soldering or otherwise securing separate strips to the body, and these openings may be used at the upper or lower sides of the body. It is preferred to employ these openings at the lower edge and the loop at the upper edge, because thereby the body is left imperforate at its upper edge, and is consequently more rigid and better able to stand the strain of operation. The fingers, it will be seen, extend across the mouth of the body, and terminate approximately over the cut-away edge *a* of such body. By this cut-away portion the body may be fitted over the fruit, and the latter will be held from dropping out at one or the other side. The fingers are also curved or arched centrally upward from the body, conforming somewhat to the fingers of the human hand, and better fit over the fruit, forming a more considerable bearing therefor, as most clearly shown in Figs. 1 and 5. The bail E is secured at its middle or central portion to the socket F, and has its ends made fast to the body on opposite sides thereof. The lower ends of the wires forming the platform are also secured to the socket, as shown. The wires may be secured to the socket by riveting or soldering. To facilitate the connection the socket may be provided in its upper end with a slot, *f*, into which the bail E is dropped. Where desired, the platform-wires may be bent around the bail, as shown in Fig. 5. This socket F is fitted to receive a suitable staff, as shown. The receiver G, which may be a bag, as shown, or a tube by which to convey the fruit to a basket or other receiver, is secured around the lower edge of the body by stitching, as shown, or in other suitable manner.

In operation it will be seen the fruit, when plucked, drops onto the platform, and is deflected thence into the receiver. The platform directs the fruit forward against the front inner side of the receiver, and thence it rolls onto the fruit below. By thus obviating the direct fall of the fruit onto that already in the receiver the bruising of the fruit is avoided. The portion of the receiver which rests on the platform C forms a cushion for such platform, the said receiver being usually made of canvas or other textile material.

Having thus described my invention, what I claim, and desire to secure by Letters Patent, is—

1. In a fruit-picker, the combination, with the body, of the wires extended above such body to form the grasping-fingers and inclined below it to form the deflecting-platform, substantially as set forth.

2. In a fruit-picker, the combination of the body, a receiver of textile fabric secured to and projecting from its lower edge, the fingers across the open end or mouth of such body, a platform of wires extended below the mouth of said body in an inclined direction to deflect one side of the receiver, which rests thereon and forms a cushion to receive and guide the fruit into the receiver, substantially as specified.

3. In a fruit-picker, the combination, with the body, provided on its rear side with loops D, of the wires held by said loops and extended above and below the body, substantially as set forth.

4. A fruit-picker, substantially as herein described, consisting of the body, the socket, the bail secured at its ends to the body and secured to the socket, and the wires held between their ends to the body, and having one end secured to the socket and their other ends extended above the body and forming the grasping-fingers, substantially as herein set forth.

In testimony whereof I affix my signature in presence of two witnesses.

JEREMIAH STONEBRAKER.

Witnesses:
 DAVID S. RAMSEY,
 DAVID SHELDEN.